July 21, 1931. A. KADOW 1,815,258
GLASS FURNACE
Filed Nov. 7, 1927 4 Sheets-Sheet 2
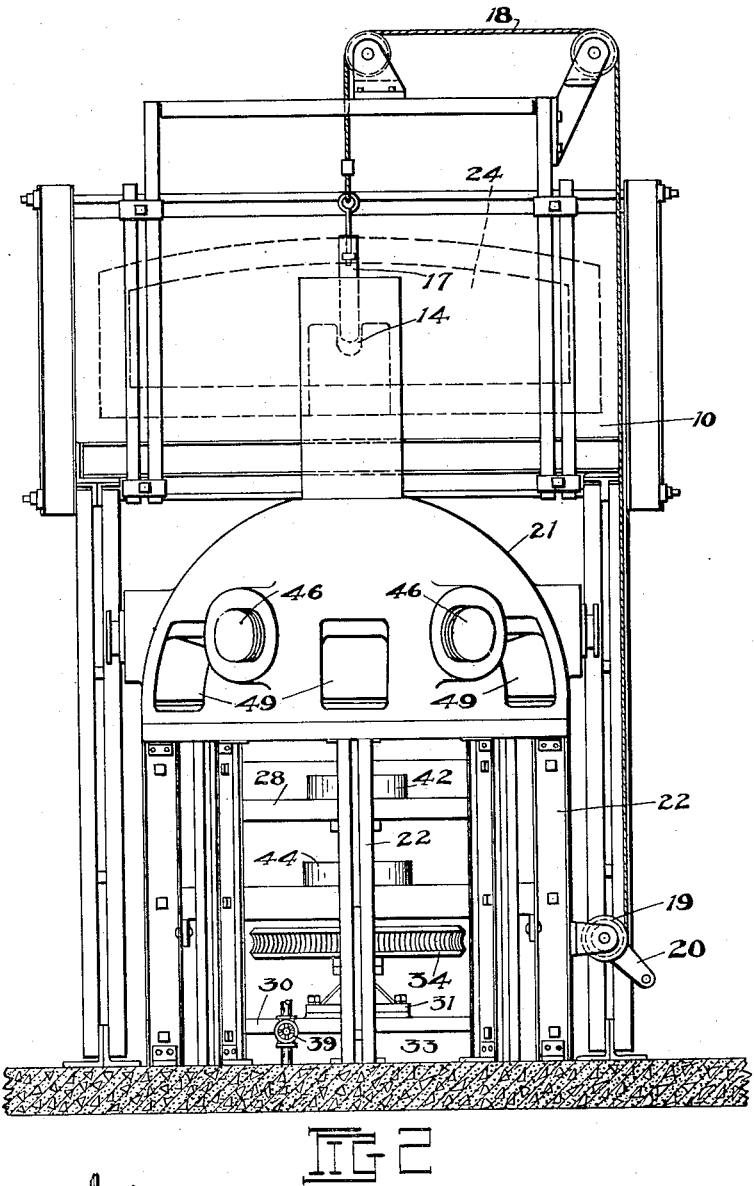
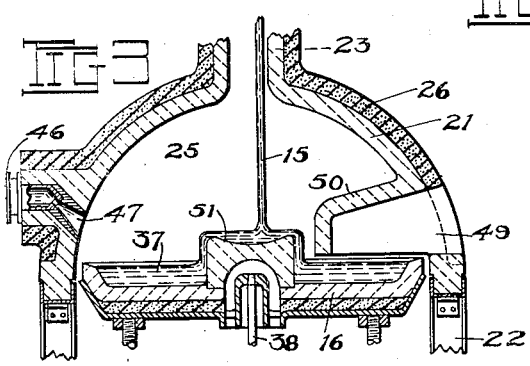
Inventor
August Kadow
By J. F. Rule
Attorney

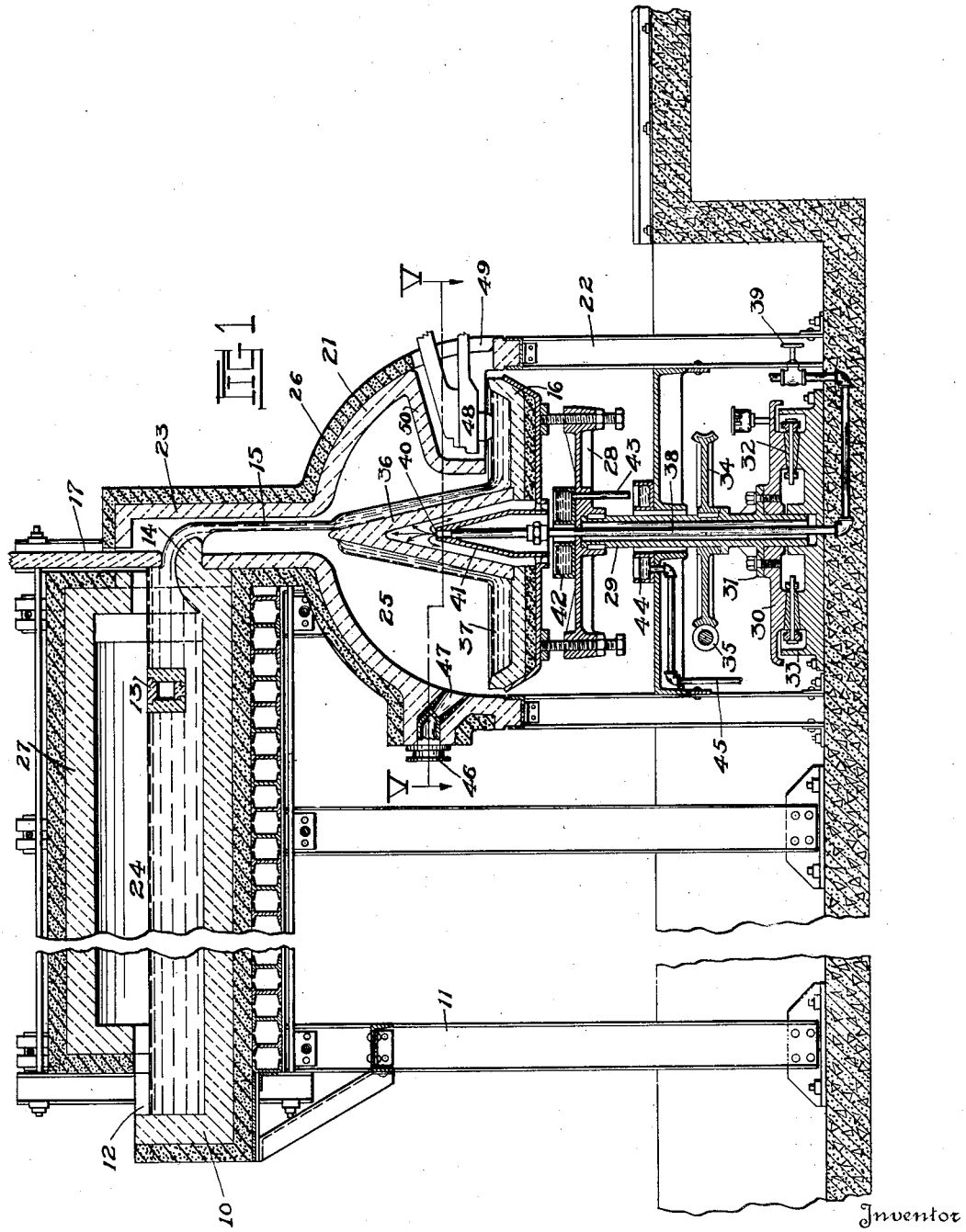

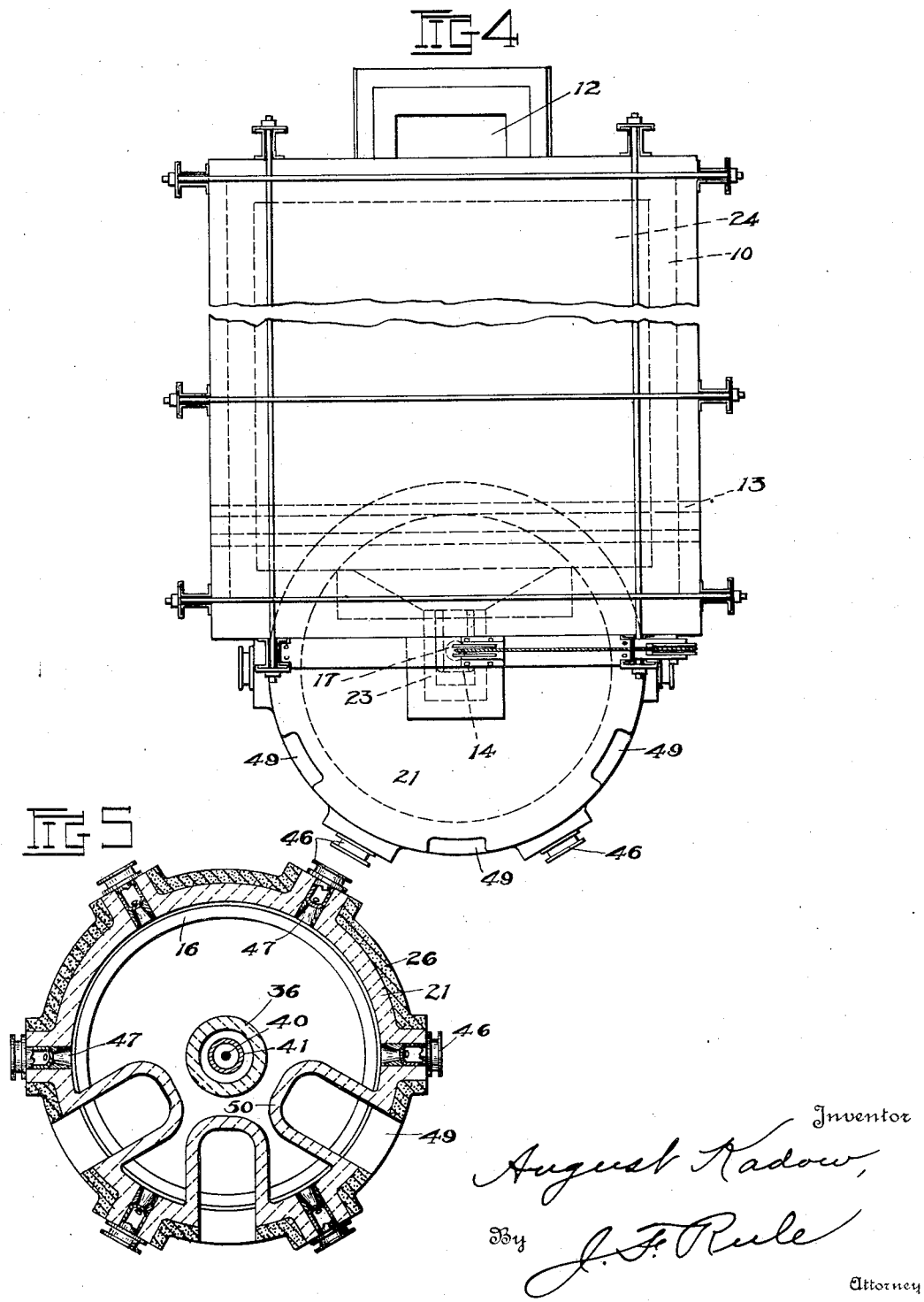

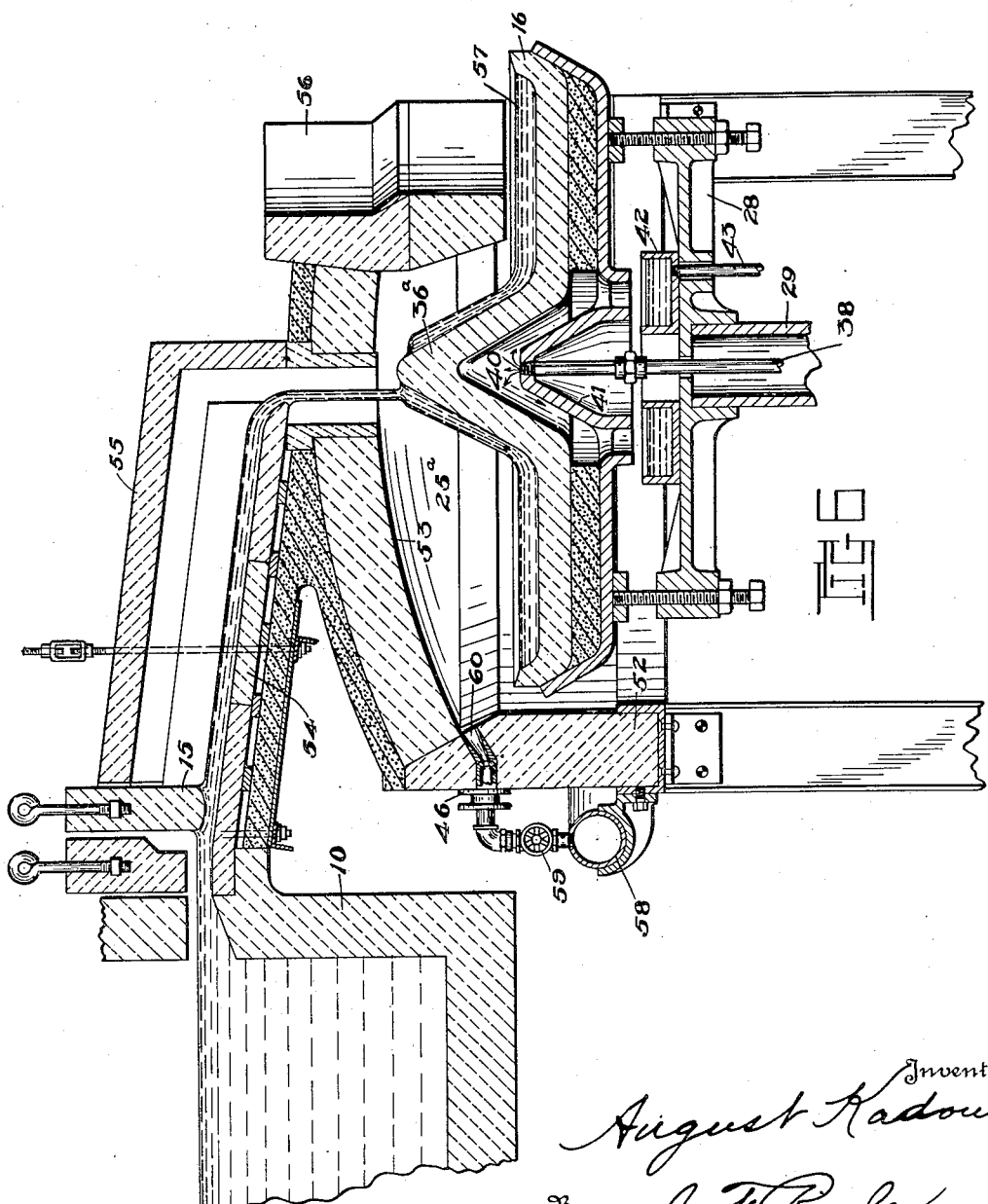

Patented July 21, 1931

1,815,258

UNITED STATES PATENT OFFICE

AUGUST KADOW, OF TOLEDO, OHIO, ASSIGNOR TO OWENS-ILLINOIS GLASS COMPANY, OF TOLEDO, OHIO, A CORPORATION OF OHIO

GLASS FURNACE

Application filed November 7, 1927. Serial No. 231,448.

My invention relates to an improved method and apparatus for regulating and controlling the condition and temperature of molten glass and supplying it to forming machines of the type in which the molds gather the glass by suction. More particularly, the invention relates to an improved form of rotary gathering pot by which the glass is brought to a gathering area, and means for distributing the glass and for regulating and controlling its temperature during its passage from the melting furnace to the gathering point in the rotating pot.

In apparatus in general use at the present day for supplying glass to machines of the suction gathering type, the glass is permitted to flow in a stream from the melting or refining tank and discharge into a rotating pot adjacent the side wall of the pot. The rotation of the pot carries the glass past a gathering station at which the molds dip into the glass in the pot and gather the glass by suction. The glass as it flows into the rotating pot is at a substantially higher temperature than when it enters the molds, the glass being cooled to a certain extent while in the rotating pot. Considerable difficulty is experienced with such equipment in properly regulating and controlling the temperature. Moreover, there is a tendency for the hot stream of glass entering the pot to form a ring or narrow zone of comparatively hot glass, the adjacent glass being relatively cool. There is thus presented at the gathering station a surface of glass which is of uneven temperature, which is a very undesirable condition.

An object of the present invention is to overcome the above objections and provide practical means for controlling the temperature of the glass in the revolving pot and also for obtaining an even distribution of the glass entering the pot, whereby glass of uniform consistency and temperature is presented to the molds at the gathering point.

In one form of the invention, the rotating pot is provided with a central cone of refractory material projecting upward above the level of the glass in the pot and rotating with the pot. The glass from the refining tank flows onto the upper part of the cone and is distributed over its entire surface and flows downward therefrom to the body of glass in the pot. An even distribution of the incoming glass is thereby obtained. There is provided means for cooling the interior surface of the cone, whereby heat is extracted from the glass as it flows downward over the outer surface of the cone. Provision is thus made for accurately controlling the temperature of the glass in the pot. Burners may be provided for heating the glass within the pot when desired. These burners may be arranged to heat the walls of the chamber or housing which encloses the pot, the heat being radiated from such walls against the surface of the glass.

Other features of the invention will appear hereinafter.

In the accompanying drawings:

Fig. 1 is a sectional side elevation view of an apparatus illustrating one form of my invention.

Fig. 2 is an end elevation of the same.

Fig. 3 is a fragmentary view showing a modified form of rotating pot and glass distributing means.

Fig. 4 is a top plan view of the apparatus shown in Fig. 1.

Fig. 5 is a sectional view as indicated by the line V—V on Fig. 1

Fig. 6 is a sectional elevation of a different form of construction from that disclosed in Fig. 1.

Referring particularly to Figs. 1, 2, 4 and 5, the main furnace comprises a tank 10 supported on a framework 11. The raw materials forming the batch are fed into the tank as usual at the dog-house 12 and melted. The melted glass flows forward from the melting compartment and passes beneath a bridge wall 13 to the refining compartment and from thence flows through a spout 14. The glass flowing from the spout descends in a vertical stream 15 and enters a rotating pot 16. The rate at which the glass flows through the spout is regulated and controlled by a plug 17 which projects downward into the spout. The plug 17 is carried by a cable 18 (Fig. 2) which extends over pulleys to a drum 19 which may be rotated by a hand crank 20 for adjusting the plug up or down. The pot 16 is surrounded and enclosed by a housing comprising a roof or dome 21 supported on a framework 22. Extending upward from the dome 21 is a flue 23 enclosing the stream of glass 15 and also forming a passageway providing communication between the combustion chamber 24 of the main furnace and the chamber 25 within the housing 21. Heat insulating material 26 is preferably employed to form a covering for the dome 21, flue 23, main furnace tank 10 and its roof 27.

The gathering pot 16 is mounted for continuous rotation about a vertical axis and for this purpose is supported on a yoke or spider 28 mounted on the upper end of a hollow drive shaft 29, the spider being keyed to said shaft to rotate therewith. A bearing plate 30 is bolted to brackets 31 which may be cast integral with the shaft 29. Said bearing plate is mounted on roller bearings 32 on a base plate 33. A worm wheel 34 keyed to the shaft 29 is driven by a worm gear 35 connected to any suitable source of power.

Within the housing 21 is a refractory cone 36 which rotates with the pot 16 and may form a part thereof. This cone is arranged concentrically with the axis of rotation of the pot and, as shown, rises from the floor of the pot. The stream of glass 15 falls onto the cone at or near the apex thereof and the rotation of the cone causes the glass to be distributed over substantially the entire surface of the cone. The glass flowing down the walls of the cone is thus uniformly distributed around the base of the cone as it enters or unites with the supply body of glass 37 in the pot.

The temperature of the interior surface of the cone 36 is reduced by suitable cooling means for the purpose of extracting heat from the glass as it flows downward over the cone. The cooling means may comprise a water pipe 38 connected to a water main and extending upward through the hollow shaft 29 into the cone 36. A valve 39 regulates the supply of water. The stream of water issuing from the nozzle 40 at the upper end of the pipe 38 is distributed over the interior surface of the cone. This distribution may be assisted by a conical shaped distributor 41 surrounding the pipe 38 and forming with the inner surface of the cone 36, a narrow passageway through which the water flows downward and from which it is discharged into an annular trough 42 mounted on the spider 28 and rotating therewith. The water discharges from the trough 42 through a pipe 43 into a stationary annular trough 44 surrounding the shaft 29 and from thence is discharged through a waste pipe 45.

It will be seen that the cone 36 serves as a means for evenly distributing the glass entering the gathering pot and also as a temperature regulating means by which the temperature of the glass as it flows from the refining tank is reduced before entering the gathering pot. Additional means for regulating and controlling the temperature of the glass in the gathering pot, comprises a series of burners 46 which may be located at intervals around the dome 21. These burners communicate with ports or passageways 47 which, as shown in Fig. 1, extend in a downwardly inclined direction through the walls and direct the flames against the glass in the pot. The burners serve to maintain a suitable high temperature in the chamber 25 and prevent the glass in the pot from cooling below the desired working temperature, and may also serve to raise the temperature of the glass if desired. Gathering heads or rams 48 (Fig. 1) may be projected through openings 49 formed in the walls of the dome 21 and gather charges of glass by suction for forming glass articles. Jack-arches 50 are provided opposite the openings 49 so that only limited areas of the glass in the pot are exposed. As shown in Fig. 2, there are three gathering openings 49, but it will be understood that the number may be increased or reduced, if desired.

Fig. 3 illustrates a modified form of means for distributing and cooling the glass entering the gathering pot. As here shown, the stream of glass 15 falls onto a distributer 51 carried by the pot 16 and arranged concentrically thereof. The upper surface of this distributer is concave, thereby forming a basin in which the glass forms a pool and from which it is distributed to the pot 16, the glass flowing in annular sheet formation over the rim of the basin and down the side walls of the distributer. The glass flowing over the distributer 51 is cooled by water discharged from the pipe 38 against the under surface of the distributer.

Fig. 6 illustrates a modified construction in which the revolving pot is positioned beyond the end of the main furnace tank and is a shorter distance below the level of the glass in the main tank. The housing enclosing the revolving pot 16 comprises vertical side walls 52 and an arched roof or dome 53. It will be noted that the roof 53 is not arched to the same extent as the dome 21 (Fig. 1) and is much closer to the revolving pot, so that the heating chamber $25^a$ is comparatively shallow. The height of the glass distributing cone $36^a$ is also correspondingly reduced. The glass from the tank 10 flows through a spout 54 which is enclosed by a roof 55. The chamber 25ª is in communication through this enclosed spout with the combustion chamber 24. In this form of the invention, as well as that shown in Fig. 1, the pressure in the combustion chamber of the main furnace and also in the chamber over the revolving pot is preferably maintained by the gases of combustion somewhat above atmospheric pressure, whereby the entrance of outside air and consequent chilling of the glass is prevented.

A jack-arch 56 is provided to expose a gathering area 57 and is of a form to permit the molds of the usual Owens type of suction gathering machine to dip into the glass for gathering mold charges. Fuel gas is distributed to the burners 46 through a manifold pipe 58 surrounding the wall 52. Valves 59 individual to the burners control the supply of gas. As shown in Fig. 6, the burners communicate with upwardly inclined passageways 60 extending through the wall 52 so that the flames are directed against the roof 53 and distributed over the surface thereof. The heat is radiated downward from this surface against the glass in the rotating pot. In this manner, the glass is heated mainly by radiation instead of by direct contact of the flames with the glass.

Modifications may be resorted to within the spirit and scope of my invention.

What I claim is:

1. The combination of a main furnace tank, a gathering pot, a conical distributer, and means for flowing a stream of glass from said tank onto said distributer and causing the glass to flow from said distributer into the gathering pot in sheet formation.

2. The combination of a main furnace tank, a gathering pot, means providing a conical distributing surface above said pot, means for directing a stream of glass from the tank onto said surface, and means to rotate said surface and thereby distribute the glass thereover, said surface arranged to discharge the glass into the pot.

3. The combination of a container for molten glass, means providing a downwardly and outwardly flared distributing surface above the level of the glass in the container, and means for flowing a stream of molten glass onto said surface and causing it to be spread over said surface and flow therefrom in sheet formation into the container.

4. The combination of a container for molten glass, means projecting upwardly from the floor of the container providing a distributing surface above the level of the glass in the container, means for flowing a stream of molten glass onto said surface and causing it to be spread over said surface and flow therefrom in sheet formation into the container, and means for extracting heat from said surface and thereby regulating the temperature of the glass entering the container.

5. The combination of a container for molten glass, means providing a downwardly and outwardly flared distributing surface above the level of the glass in the container, means for delivering molten glass onto said surface, and means for causing a continuous movement of said surface by which the glass is distributed thereover and caused to enter the container in sheet formation.

6. The combination of a container for molten glass, means providing a downwardly and outwardly flared distributing surface above the level of the glass in the container, means for delivering molten glass onto said surface and causing it to be spread over said surface and flow therefrom in sheet formation into the container, and means for continuously rotating said container.

7. The combination of a container for molten glass, means providing a distributing surface above the level of the glass in the container, means for delivering molten glass onto said surface, and means for continuously rotating said container and said distributing surface about a vertical axis to thereby spread glass over said surface and continuously present areas of fresh glass in the container at a mold charging station, said surface being positioned to discharge the glass into the container.

8. The combination of a rotating gathering pot, a closure surrounding and enclosing said pot, a wall within said closure curved about the axis of rotation of the pot and providing a glass distributing surface, means for supplying molten glass, means for causing the glass to be spread over said surface and flow therefrom in sheet form into the pot, and means for supplying a temperature regulating medium to the opposite surface of said wall and thereby regulating the temperature of the glass flowing over said surface.

9. The combination of a rotating gathering pot, a closure surrounding and enclosing said pot, a wall within said closure providing a glass distributing surface, means for flowing a stream of molten glass onto said surface and causing it to be spread thereover and flow therefrom into the pot, and means for supplying a cooling fluid and directing it against the opposite surface of said wall and thereby extracting heat from the glass flowing over said wall to regulate the temperature of the glass in the revolving pot.

10. The combination of a rotary gathering pot, means for supplying molten glass thereto, and means for distributing the glass comprising a downwardly and outwardly flared conical surface concentric with said pot and over which the glass is distributed and from which it flows into the pot.

11. The combination of a rotary gathering pot, means for supplying a stream of molten glass and causing it to enter the pot, a closure device comprising side walls surrounding the pot and an arched roof or dome thereover whereby a heat chamber is provided, and burners arranged to direct heating flames against said dome and cause the heat to be reflected downward against the glass in the pot.

12. The combination of a supply tank, a revolving pot, a heat chamber enclosing said pot, means for directing molten glass from said tank through the heat chamber into the pot, means for supplying heat to said chamber and regulating the temperature of the glass in the pot, and cooling means arranged to extract heat from the glass during at least a part of its passage through the heat chamber before it enters the pot.

13. The combination of a supply tank for molten glass, a revolving pot, a heat chamber enclosing said pot, means for conducting glass from the tank to the interior of said chamber for delivery to the pot, means for supplying heat to said chamber and regulating the temperature of the glass in the pot, means providing a conical distributing surface rotating with the pot upon which incoming glass is deposited and over which the glass is distributed before entering the pot, and means for extracting heat from the glass through said surface and thereby further regulating and controlling the temperature of the glass in the pot.

14. The combination of a rotary gathering pot, a distributor, means for supplying molten glass thereto, said distributor having downwardly and outwardly flared walls arranged to distribute the glass and cause it to enter the pot in annular sheet formation.

15. The combination of a gathering pot, a conical distributor thereover, means for delivering molten glass onto said distributor and causing the glass to flow from the distributor into the gathering pot in sheet formation.

16. The combination of a gathering pot, means providing a conical distributing surface above the pot, means for supplying molten glass and directing it onto said surface, and means to rotate said surface and thereby distribute the glass thereover, said surface being positioned and arranged to discharge the glass into the gathering pot.

17. The combination of a container for molten glass, means providing a downwardly and outwardly flared distributing surface above the glass in the container, and means for delivering molten glass onto said surface and causing it to be spread over said surface and flow therefrom in sheet formation into the container.

18. The combination of a rotating gathering pot, means for supplying molten glass and causing it to enter the pot, a closure device comprising side walls surrounding the pot and an arched roof or dome thereover whereby a heat chamber is provided, and burners arranged to direct heating flames against said dome and cause the heat to be reflected downward against the glass in the pot.

19. The combination of a container for molten glass, means including a member rising from the floor of the container providing a distributing surface above the level of the glass in the container, means for flowing a stream of molten glass onto said surface and causing it to be spread over said surface and flow therefrom in sheet formation into the container, and means for continuously rotating said container and distributing surface.

20. The combination of a rotating gathering pot, a closure surrounding and enclosing said pot, means within said closure and above the glass providing a conical distributing surface, means for rotating said surface, means for delivering molten glass onto said surface and causing it to be spread thereover and flow therefrom into the pot, and means for supplying a temperature regulating medium to the opposite surface of said wall and thereby regulating the temperature of the glass flowing over said surface.

Signed at Toledo, in the county of Lucas and State of Ohio, this 4th day of November, 1927.

AUGUST KADOW.